June 29, 1937.  A. NAGEL  2,085,468
OBJECTIVE SHUTTER DISTANCE ADJUSTING AND RELEASING
APPARATUS ON PHOTOGRAPHIC CAMERAS
Filed Jan. 5, 1937
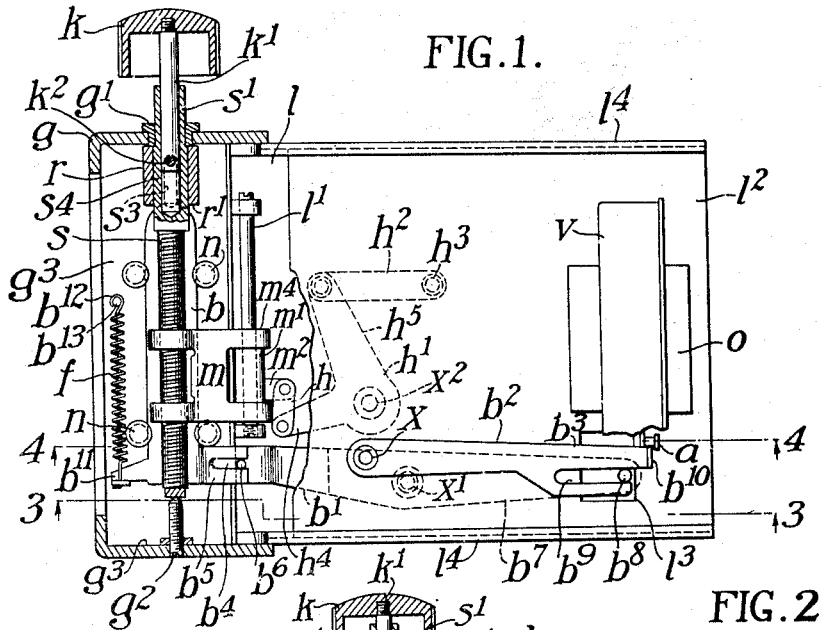
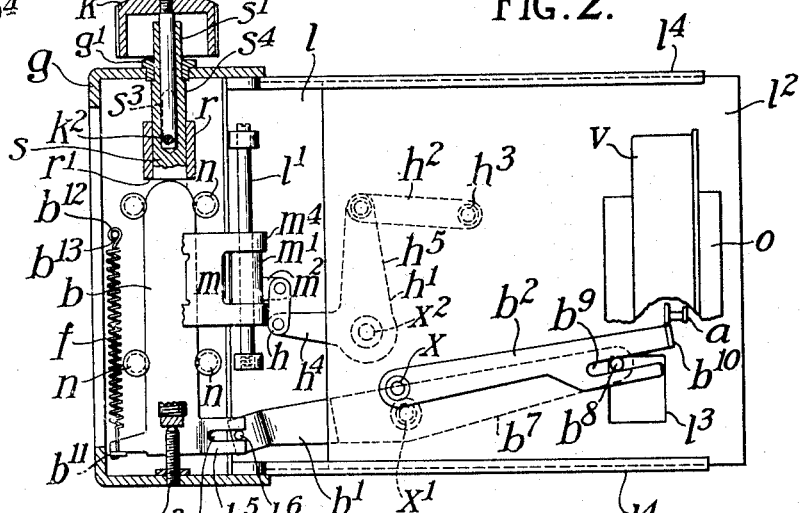
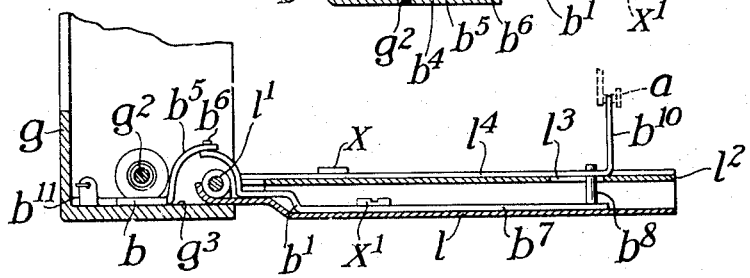
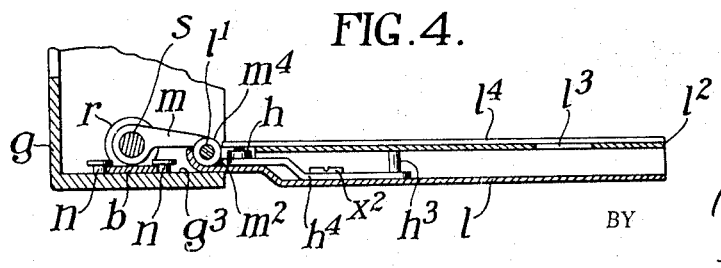
August Nagel
INVENTOR.
Newton M. Perrins
George A. Gillette, Jr.
BY ATTORNEYS Patented June 29, 1937

2,085,468

UNITED STATES PATENT OFFICE 2,085,468

OBJECTIVE-SHUTTER DISTANCE-ADJUSTING AND RELEASING APPARATUS ON PHOTOGRAPHIC CAMERAS

August Nagel, Stuttgart, Germany, assignor to The Eastman Kodak Company, Rochester, N. Y., a corporation of New Jersey Application January 5, 1937, Serial No. 119,135 In Germany December 27, 1935

6 Claims. (Cl. 95—45)

The invention has as its subject matter an objective adjusting or focusing arrangement for a photographic apparatus which is mounted in such a manner that it forms the operating means for the release of the exposure shutter.

It is already known that exposure shutters for folding cameras may be operated from the camera housing and also that a movable carriage supporting the photographic objective may be focused by a remotely controlled arrangement.

The primary object of the present invention is the provision of a photographic apparatus including an objective and exposure shutter in combination with a focusing means for focusing said objective, an actuating means for operating said shutter and operating means for operating said focusing means and said actuating means.

Another object of the invention is the provision of an operating member which may be rotated to impart a focusing movement to an objective and which may be moved axially to cause actuation of the exposure shutter.

A further object of the invention is the provision of an actuating means for an exposure shutter on the movable carriage of a folding camera, which carriage also supports a photographic objective, said actuating means operating to actuate the exposure shutter irrespective of the position of the movable carriage to focus the objective.

Other and further objects of the invention will be suggested to those skilled in the art by the disclosure which follows.

To these and other ends, the invention consists of certain parts and combination of parts all of which will be hereinafter described, the novel features being pointed out in the appended claims.

An embodiment of the subject matter of the invention is represented in the accompanying drawing, of which Fig. 1 shows a plan, with the objective and focusing means in the infinity position;

Fig. 2 shows a plan like Fig. 1, but with the actuating means for the exposure shutter in the position to operate said shutter and with the focusing means adjusted to focus said objective upon near objects;

Fig. 3 is a longitudinal section on the line 3—3 of Fig. 1 and shows distinctly the parts for operating the release; and Fig. 4 is a longitudinal section on the line 4—4 of Fig. 1 and shows the focusing means distinctly.

The screw-threaded spindle or threaded member $s$ is mounted in the camera housing $g$, being guided therein by a bush $g^1$ and a bearing centre $g^2$. The screw-threaded spindle $s$ has, at the end which is opposite the bearing centre, a central longitudinal bore $s^1$. The stem $k^1$ of the knob $k$ of the spindle $s$ is carried in the said longitudinal bore. A transverse pin $k^2$, which is provided on the stem $k^1$, passes through a longitudinal slot $s^3$ in an extension $s^4$ of the spindle and, with its outer end, engages in a hole in a ring or sleeve $r$. Bearing on the inner face $r^1$ of the ring $r$, is the adjacent end of a slide $b$ which is guided on the inner face $g^3$ of the camera housing by, for example, rivets or the like $n$ and which bears on the said inner face $r^1$ under the action of the spring $f$, one end of which is fixed to the projection $b^{11}$ on $b$ whilst the other end $b^{12}$ is fixed to the pin $b^{13}$. Opposite this projection $b^{11}$, the slide $b$ has a part $b^5$ which is of arcuate shape upwards and which overlaps the axis about which the folding bed $l$ is turned and has a central longitudinal slot $b^4$. In the front end of the said slot there engages a pin-shaped projection $b^6$ on the end of one arm of a lever $b^1$. The latter is rotatable on the folding bed $l$ about a bearing screw $x^1$. On the other end $b^7$ of the lever $b^1$ there is provided a pin $b^8$, which passes through an opening $l^3$ in a carriage $l^2$ that slides along guides $l^4$ arranged along both sides of and above the folding bed $l$. The said pin $b^8$ engages, by means of its end that is located above the surface of the carriage, in a longitudinal slot $b^9$ in the lever $b^3$ which can be rocked about an axle $x$ above the last mentioned surface and which has, at its end that faces the objective shutter $v$, an upwardly bent portion $b^{10}$ which bears on the release or shutter operating arm $a$.

Therefore, if a pressure is exerted on the knob $k$ in the direction of the camera housing, the pin $k^2$ takes the sleeve $r$ with it, $r^1$ presses against the slide $b$, and the latter takes the pin $b^6$ of the lever with it by means of the slot $b^4$. The lever $b^1$ is rocked about the axle $x^1$ and, by means of the pin $b^8$, it takes with it the lever $b^2$ which, at its end $b^3$ exerts a pressure on the release $a$ of the objective shutter $v$ by means of the projection $b^{10}$, by which pressure the operation of the shutter and, consequently, the exposure of the light-sensitive layer of the film or the like are effected. When the pressure on the knob $k$ ceases, all the parts are returned into their original position by the spring $f$. Before the described releasing of the shutter was effected, this knob $k$ performed a totally different operation— namely, by being rotated, it rotated the screw-threaded spindle $s$ and moved a double T-shaped part or nut member $m$ along the spindle $s$ in either direction depending upon the direction of rotation of said knob $k$. When this was being done, the part $m$ took with it, by means of its front projections $m^4$, a sleeve $m^1$ along a guiding rod $l^1$, which sleeve, by means of a projection $m^2$, pulled with it a linkage $h$ which is hingedly co mounted on the said projection. This linkage, by means of an arm $h^4$ of a bell crank lever $h^1$, which is hingedly connected with the linkage $h$ and is rotatable on the baseboard about the axle $x^2$, Fig. 4, rotated this lever $h^1$, with the result that a linkage $h^2$, which is hingedly arranged on the end of the other arm $h^5$, pushed forward the carriage $l^2$ in the guides $l^4$ on the baseboard $l$ by means of a pin $h^3$, thus shifting the objective shutter $v$ and the objective $o$ and so carrying out the adjustment of the objective to near objects.

Since other modifications of the invention may be accomplished without departing from the spirit thereof, the present disclosure is to be considered in an illustrative sense and limited only by the appended claims.

I claim:

1. In a photographic camera, the combination with a camera housing including a camera body and a movable carriage, an objective movably mounted upon said carriage, and a shutter also mounted upon said carriage and including a shutter operating arm, of a focusing means between said objective and said camera body and for imparting a focusing movement to said objective, an actuating means between said shutter operating arm and said camera body and for operating said arm, and an operating member mounted on said camera body for two types of movement and operatively but independently connected to said focusing means and to said actuating means whereby one type of movement of said operating member operates only the focusing means while the other type of movement of said operating member operates only the actuating means.

2. In a photographic camera, the combination with a camera housing including a body and a movable carriage, an objective mounted upon said carriage, and a shutter also mounted upon said carriage and including a shutter operating arm, of a focusing means between said carriage and said body and for imparting a focusing movement to said objective, an actuating means between said shutter operating arm and said body and for operating said arm, and a single operating member rotatably and axially movable on said body, independently and operatively connected to said focusing means and to said actuating means and for operating said focusing means only upon movement in one sense and for operating said actuating means only during movement in the other sense.

3. In a photographic camera, the combination with a camera housing including a camera body and a folding bed which is movable to a closed position and to an open position, a carriage movably mounted upon said bed, and an objective and shutter assembly upon said movable carriage and including an operating arm extending from said shutter, of a focusing means between said carriage and said camera body and for imparting a focusing movement to said objective, an actuating means between said shutter operating arm and said camera body and for operating said arm on said shutter, said focusing means and said actuating means being foldable into said camera body upon closing of said folding bed, an operating member mounted on said camera body for rotational movement and for axial movement, an operative connection between said focusing means and said operating member, and a second operative connection between said actuating means and said operating member, said operative connections being independent of each other whereby movement of the operating member in one sense to operate said focusing means does not operate said actuating means and movement of the operating member in the other sense operates only the actuating means.

4. In a photographic camera, the combination with a camera housing including a body and a movable carriage, an objective mounted upon said carriage, and a shutter also mounted upon said carriage and including a shutter operating arm, of a focusing means between said carriage and said housing and including a rotatable member on said body for imparting a focusing movement to said objective, an actuating means operatively connected to said shutter operating arm and including a slidable member on said body for actuating said arm, and an operating member on said housing operatively connected to said rotatable member and to said slidable member, adapted upon rotation of said operating member to turn said rotatable member of said focusing means to focus said objective, and adapted upon axial movement of said operating member to move said slidable member of said actuating means to actuate said shutter operating arm.

5. In a photographic camera, the combination with a camera housing having a folding bed which is movable to a closed position and to an open position, a carriage movably mounted upon said bed, and an objective and shutter assembly upon said movable carriage and including an operating arm extending from said shutter, of a focusing connection including a threaded member, a nut member engaging the same, and a bell crank pivoted on said folding bed, having one arm connected to said carriage and the other end connected to said nut member, an actuating connection including a lever pivoted to said folding bed, an actuator pivoted on said carriage for engaging said operating arm and engaged and operated by said lever, and a slide slidably mounted on said housing and for engaging and operating said lever, and an operating member on said camera housing, connected to said threaded member for rotating the same, and operatively engaging said slide to move the same upon axial movement of said operating member.

6. In a photographic camera, the combination with a camera housing including a body and a movable carriage, an objective mounted upon said carriage, and a shutter also mounted upon said carriage and including a shutter operating arm, of a focusing means between said carriage and said housing and including a rotatable member on said body for imparting a focusing movement to said objective, an actuating means operatively connected to said shutter operating arm and including a slidable member on said body for actuating said arm, an operating member mounted for rotation and for axial movement upon said camera housing, and a pin and slot connection between said operating member and said rotatable member of said focusing means and for permitting axial movement of said operating member independently of the rotation thereof and vice versa.

AUGUST NAGEL.